United States Patent [19]
Darling et al.

[11] Patent Number: 5,892,152
[45] Date of Patent: Apr. 6, 1999

[54] MULTIPLE VIBRATORY ROTATION SENSORS WITH MULTIPLEXED ELECTRONICS

[75] Inventors: Jeffrey Scott Darling, Goleta; Robert Schwarz, Santa Barbara; Guy Thomas Varty, Woodland Hills, all of Calif.

[73] Assignee: Litton Systems, Inc., Woodland Hills, Calif.

[21] Appl. No.: 901,915

[22] Filed: Jul. 29, 1997

[51] Int. Cl.[6] .................................................. G01C 19/00
[52] U.S. Cl. .................................. 73/504.13; 73/504.03; 73/1.77
[58] Field of Search ........................... 73/504.02, 504.03, 73/504.04, 504.08, 504.13, 510, 1.77, 1.84; 74/5.34, 5.4, 5.41

[56] References Cited

U.S. PATENT DOCUMENTS

| | | | |
|---|---|---|---|
| 3,640,137 | 2/1972 | Allen et al. | 73/1.77 |
| 3,680,391 | 8/1972 | Denis | 73/504.13 |
| 4,157,041 | 6/1979 | Loper, Jr. et al. | 73/504.13 |
| 4,951,508 | 8/1990 | Loper, Jr. et al. | 73/504.13 |
| 5,194,872 | 3/1993 | Musoff et al. | 73/1.77 |
| 5,357,817 | 10/1994 | Weinberg | 73/504.08 |
| 5,763,780 | 6/1998 | Matthews et al. | 73/504.13 |

*Primary Examiner*—Hezron Williams
*Assistant Examiner*—Helen C. Kwok
*Attorney, Agent, or Firm*—Price Gess & Ubell

[57] ABSTRACT

A vibratory rotation sensor comprising a resonator, a resonator housing and a method for controlling and reading out signals from the sensor is packaged in groups of three, along with a single control and read-out electronics circuit which is either time division multiplexed, frequency multiplexed or a combination of both for the three sensors. This multiple sensor package is compact, lightweight, rugged and well suited for use as an inertial measurement instrument in several subterranean environments such as in mining, tunneling, and oil and gas drilling applications.

9 Claims, 4 Drawing Sheets

MULTIPLE VIBRATORY ROTATION SENSORS WITH MULTIPLEXED ELECTRONICS

BACKGROUND OF THE INVENTION

1. Field of the Invention

This invention relates to a class of vibratory rotation sensor in which the vibrating member is a thin-walled axi-symmetric hemispherical shell, and more specifically pertains to the control and readout electronics for such a sensor.

2. Description of Related Art

A prior art vibratory rotation sensor 10 is illustrated in FIG. 1 in an exploded view, as having an outer member 12, a hemispherical resonator 14, and an inner member 16, all of which are made of fused quartz and are joined together with indium. This particular type of vibratory rotation sensor, which has a vibrating member 14 that is a thin-walled axi-symmetric hemispherical shell, is known as a hemispherical resonator gyro (HRG).

The inertially sensitive element in the HRG is the hemispherical resonator 14, usually a thin-walled 5.8 centimeter diameter bell-shaped object positioned between an outer member 12 and an inner member 16 and supported between the inner and outer members by a stem 26.

The thin-walled axi-symmetric hemispherical shell 14 oscillates in one of its lower-order flexing modes (FIG. 2). The shell resonator flexing mode takes the form of a standing wave. The standing wave, which exists around the rim of the shell resonator 14, is shown in its two extremes, 36 and 38, of its oscillatory deformation in FIG. 2.

The elliptical standing wave contains four anti nodes and four nodes, the anti nodes and nodes being separated from one another by 45 degrees. The rotation sensitivity of the standing wave results from the fact that each mass element of the shell undergoing oscillation acts much like a Foucault pendulum attempting to keep the direction of its linear momentum fixed in inertial space when the shell rotates about its axis. The resulting Coriolis forces, the product of the shell's vibratory motion, and the inertial input rate, cause the standing wave to precess with respect to the shell. The standing wave precession angle is known as the gain of the gyro.

In operation, forces are required to control the standing wave on the hemispherical shell resonator 14. These forces are quasi-electrostatic in nature. In the case of the HRG in FIG. 1, a number of electrodes 22 are metallized on the inside surface 20 of the outer housing 12, which is concentric with the hemispherical shell resonator 14. The outer surface 32 of the shell resonator 14 is metallized so that when the device is assembled, the electrodes in the outer housing 12, together with the surface of the resonator they face, form a series of forcing electrostatic capacitors. Voltages applied to the appropriate combinations of these electrodes control the amplitude of the standing wave and also act to suppress unwanted quadrature effects.

Rotation of the HRG 10 about an axis normal to the plane of the rim 34 of shell resonator 14 causes the standing wave to rotate in the opposite direction with respect to the HRG by an angle proportional to the angle of rotation of the HRG 10. Thus, by measuring the angle of rotation of the standing wave with respect to the HRG 10, one can determine the angle of rotation of the HRG 10.

The vibrational mode of the shell resonator 14 is excited by placing a DC bias voltage on the resonator and an AC voltage on the forcing electrodes 22. The frequency of the AC voltage is usually about twice the resonant frequency of the hemispherical shell resonator 14.

Readout signals from the HRG containing information about the amplitude and location of the standing waves on the shell resonator 14 are also obtained capacitively. The capacitive readout is formed by a metallized interior surface 30 of the shell resonator 14 and a plurality of electrodes 24 which are located on an inner concentric quartz housing held in close proximity to the inner metallized shell resonator 14. Because of the shell's oscillating deformation, the capacitance of each of the electrodes 24 is modulated at the resonator flexing frequency. An electronic readout circuit measures these capacitance changes and hence the location and amplitude of the standing wave is determined.

This HRG construction is inherently highly reliable. Its internal electronics consist solely of passive capacitive electrodes sealed in a vacuum. The capacitive electrodes are formed from metallized quartz and a vacuum dielectric between the metallized electrode surfaces, and hence are extremely reliable.

A more compact HRG design involves the concepts of reverse pickoff for readout and combined control and excitation drivers. Rather than measuring the capacitive changes of electrodes 24 to determine the location and amplitude of the standing wave, a readout signal taken directly from the shell resonator 42 (FIG. 3) will provide this same information and require only a single buffer amplifier 48 for the readout signal, rather than a buffer amplifier for each of the capacitive readout electrodes 24. Moreover, the control functions for the HRG can be combined into one set of drive amplifiers 52, 54, 56 and 58 which are connected to the electrodes 50 of the inside inner member 16, thereby eliminating the need for the outer member 12. Such an HRG design is called a single-sided HRG 40. The control and excitation drive signals can be combined into a single set of amplifiers because these are all signals that are input into the gyro. Moreover, the excitation voltages and the control force voltages are at different frequencies. Because of this characteristic, it is possible to apply them to the same capacitive electrodes 44. This eliminates considerable analog circuitry and the requirement for using an outer member 12. The resulting single-sided HRG, because of its size reduction, has found considerable acceptance in applications where small size is at a premium, as is the case in oil well drilling applications and small space systems.

Additional and more specific details of vibratory rotation sensors can be found in U.S. Pat. No. 4,951,508 issued to Loper, Jr. et al. Aug. 28, 1990, the entire disclosure thereof being incorporated herein.

In inertial measurement applications for both space and subterranean environments, minimum-sized gyro packages are required. Moreover, for subterranean applications such as mining, tunneling, and oil and gas drilling, the gyroscope package must survive temperatures in excess of 150° C., along with high shock and vibration. Packaging becomes a considerable problem when the gyros and the electronics must fit into small diameter (less than two inches) boring and drilling tools.

In applications when multiple gyros are required, and specifically three gyros are packaged into a single compact container with each gyro positioned at 120° spacing, the electronics required for the three gyros is much larger than the gyros themselves.

SUMMARY OF THE INVENTION

By time or frequency multiplexing or a combination of both, a single electronics circuit is used by all three gyros in a gyroscope package, reducing the entire electronics package to one-third without any loss in inertial information from the gyro package.

BRIEF DESCRIPTION OF THE DRAWINGS

The exact nature of this invention, as well as its objects and advantages, will be readily appreciated upon reference to the following detailed description when considered in conjunction with the accompanying drawings, in which like reference numerals designate like parts throughout the figures thereof, and wherein.

DESCRIPTION OF THE PREFERRED EMBODIMENTS

Figure 4:
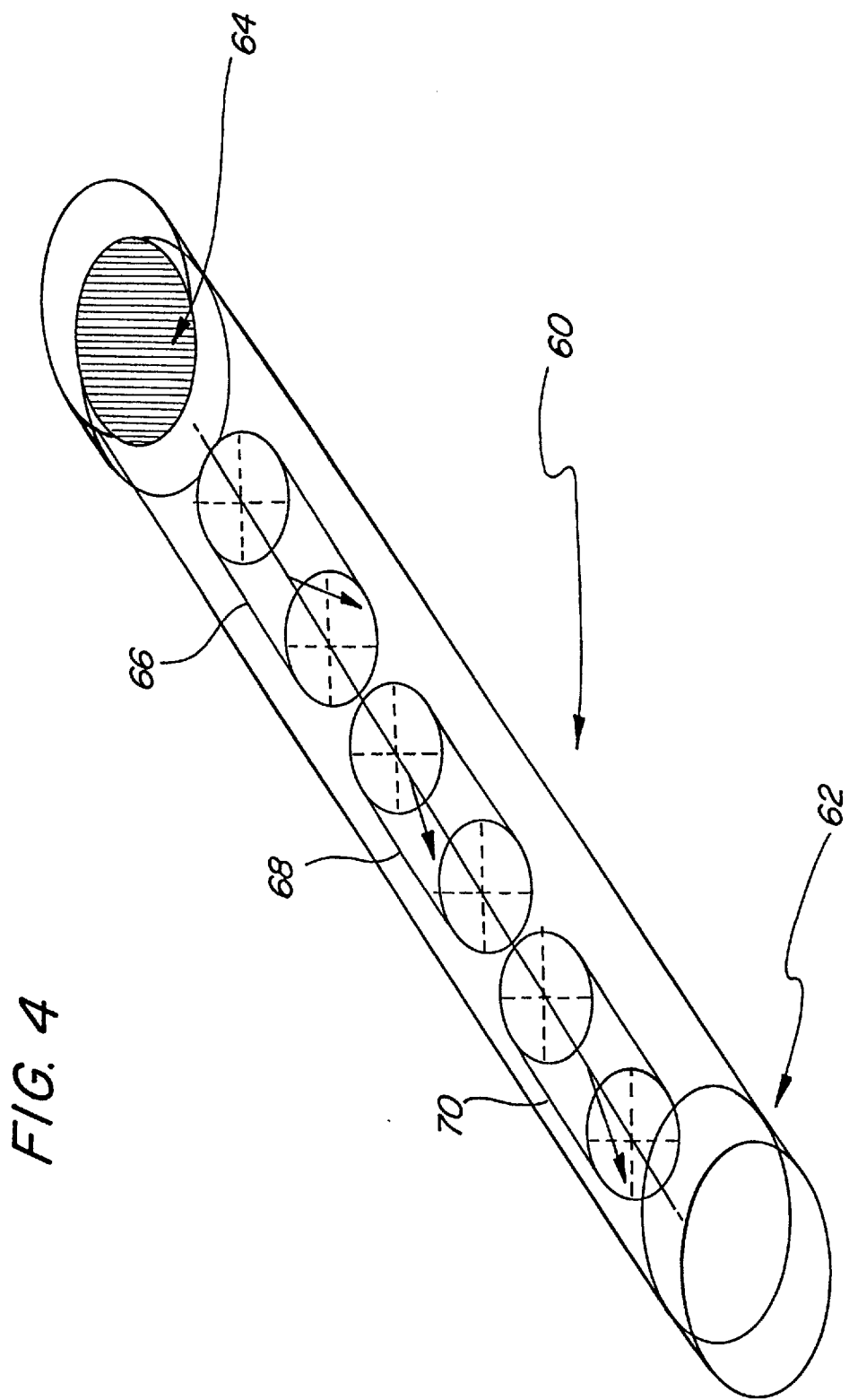
FIG. 4 schematically illustrates a three-gyro package assembly.

FIG. 4 illustrates a preferred three-axis gyro package 60 wherein three identical gyro assemblies 66, 68, 70 are located in the package end-to-end, at 120 degree increments, to maintain an orthogonal three-axis package. The system electronics is located at one end 64 of the package. The lead end of the package 60 could contain the common getter subassembly 62.

Figure 5:
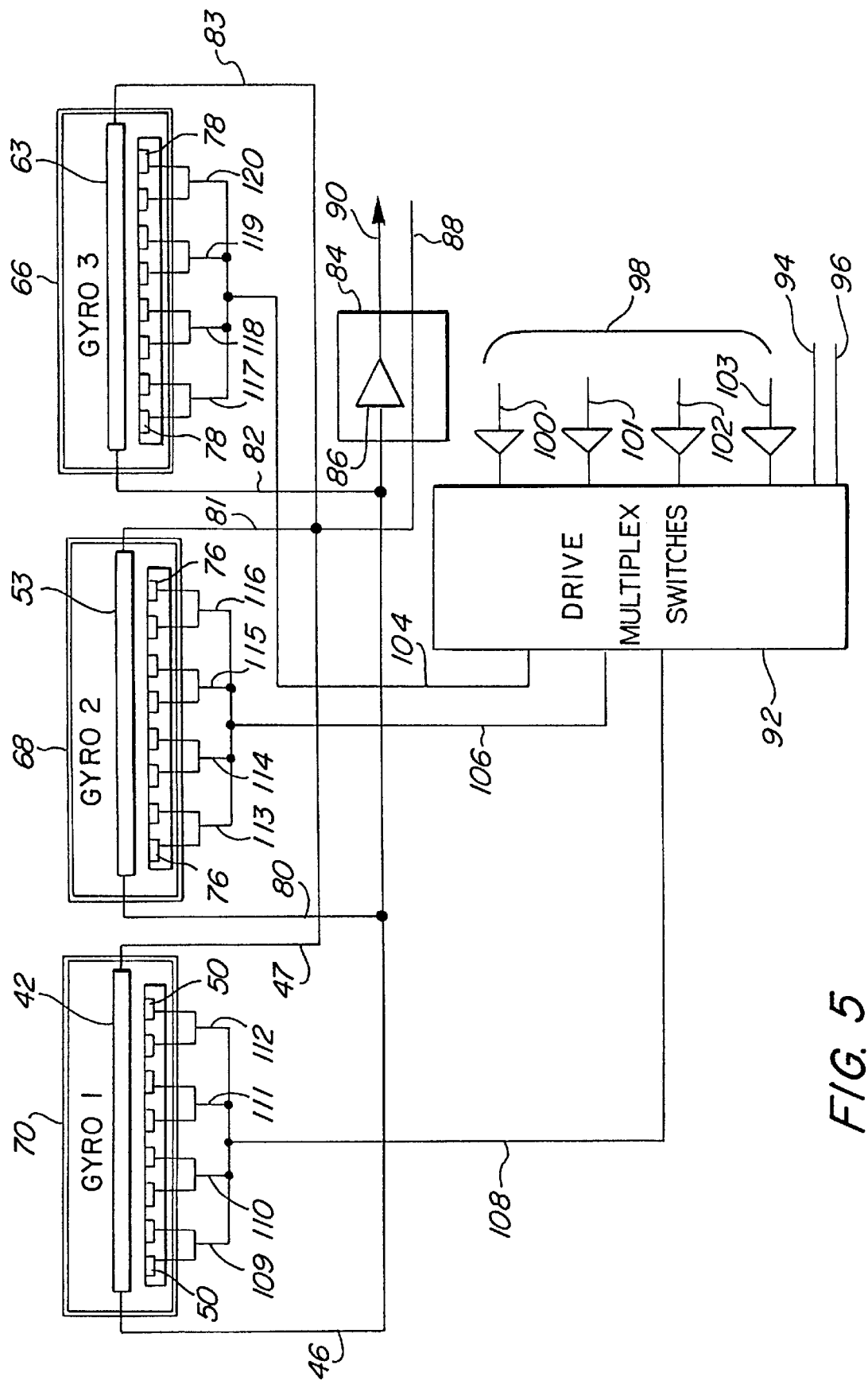
FIG. 5 schematically illustrates the multiplexed electronics circuit for the three gyros.

Referring now to FIG. 5, the preferred embodiment of the present invention is illustrated in conjunction with three single-sided HRG gyro 66, 68 and 70 labeled as gyros 3, 2 and 1, respectively. Each gyro has two connections to its shell resonator. Shell resonator 42 of gyro 70 has a readout connection 46 and a voltage bias connection 47. Gyro 68 has a readout connection 80 and a voltage bias connection 81. Gyro 66 has a readout connection 82 and a voltage bias connection 83. The bias connections 47, 81 and 83 of gyros 70, 68 and 66 are connected together to input line 88. The readout connections 46, 80 and 82 are connected together as an input to RF buffer amplifier 86 which supplies readout signals at its output 90 for further processing.

Single-sided gyros have one set of drive electrodes. Gyro 70 has drive electrodes 50, gyro 68 has drive electrodes 76, gyro 66 has drive electrodes 78. These electrodes provide both the excitation and control voltages needed for the gyros to operate. Multiple conductor cables 108, 106 and 104 respectively connect gyros 1, 2 and 3 to drive multiplex switches 92. Multiple conductor cable 108 connects the drive amplifiers 98 to the drive electrodes 50 of the first gyro 70 by pairing input signal 100 with drive line 109, input signal 101 with drive line 110, input signal 102 with drive line 111 and input signal 103 with drive line 112. Multiple conductor cable 106 pairs inputs 100, 101, 102 and 103 with input lines 113, 114, 115 and 116 of the second gyro 68. Multiple conductor cable 104 pairs inputs 100, 101, 102 and 103 with input lines 117, 118, 119 and 120 of the third gyro 66. Drive multiplex switches 92 are preferably analog switches that could operate at a submultiple, or a multiple of the gyro operating frequency, which may be at 4 kHz. In a slow dynamic situation, the switches would operate to sample each gyro for a complete inertial information update. For a high dynamic situation, the switching frequency would be much higher than the operating frequency of the gyro.

Figure 1:
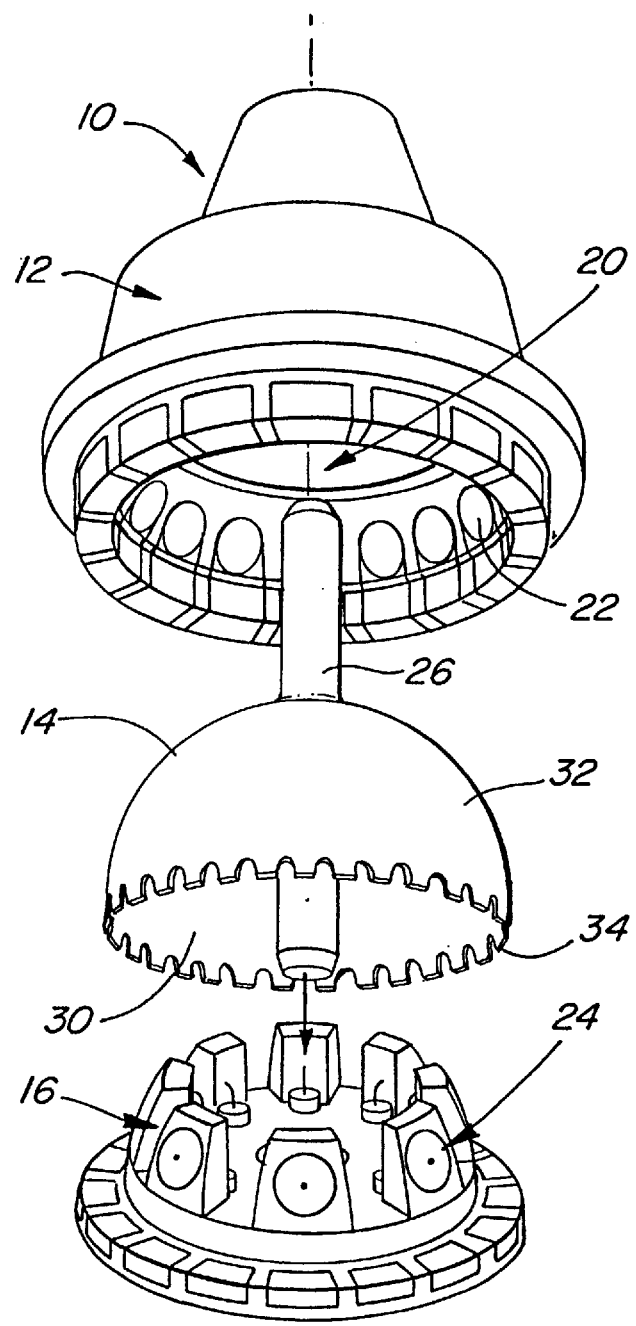
FIG. 1 is a perspective of a blown-up prior art vibratory rotation sensor.
Figure 2:
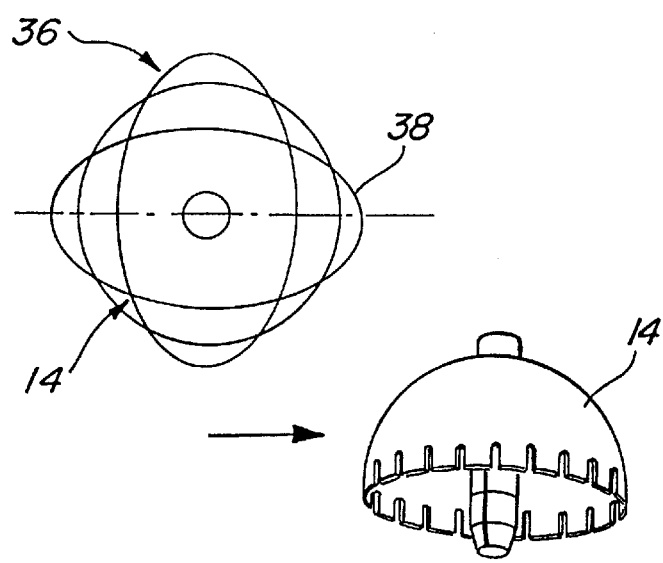
FIG. 2 is a graphic illustration of the hemispherical shell in a vibratory sensor.
Figure 3:
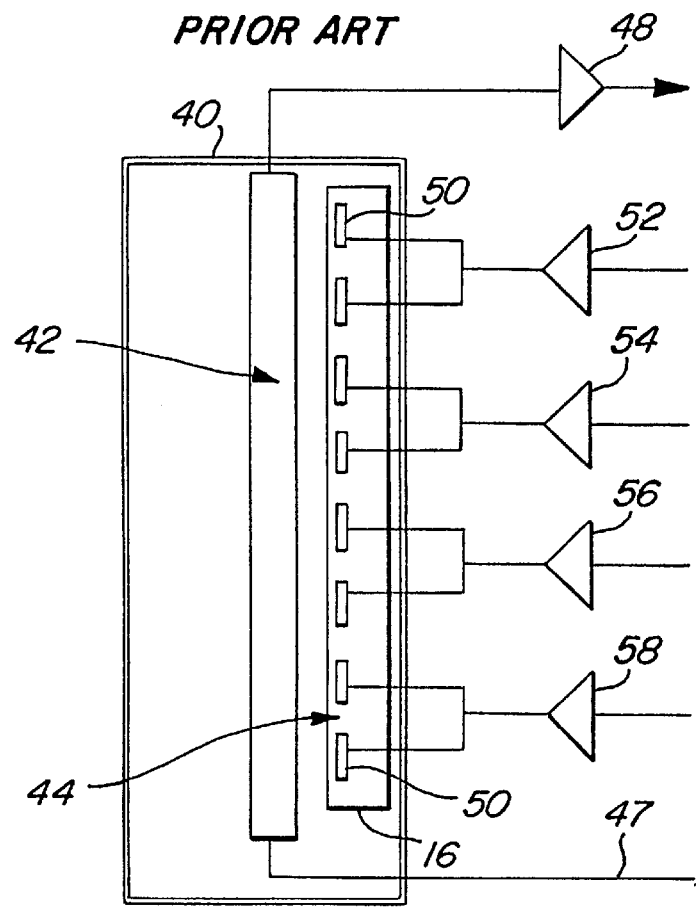
FIG. 3 schematically illustrates a single-side vibratory rotation sensor.

The use of analog switches is for time division multiplex of the drive electronics. The switches connect the drive amplifiers 98 to each gyro for a portion of the cycle sufficient to keep the amplitude of the shell resonator constant. The analog switches connect the drive amplifiers 98 having input signals 100, 101, 102 and 103, during their time division segment in the manner illustrated in FIG. 3. Control line 94 activates the switching from one gyro to another. Control line 96 powers the discreet circuitry switches.

By multiplexing the drive amplifiers between the three gyros in this way, a lower cost three gyro package is obtained as the result of the lower electronics cost, along with approximately a one-third decrease in power consumption and the elimination of considerable weight and need for packaging space.

Frequency multiplexing of the three gyros 66, 68 and 70 may also be utilized by simply driving the gyros at three sufficiently different frequencies. The frequency selected should be different from the operating frequency of the gyro, and preferably much greater. A third preferred multiplexing scheme that has certain operating advantages is a combination of time division and frequency division multiplexing used together.

It should be remembered that although the preferred embodiments show the use of three gyros, in some applications it is desirable to package a fourth gyro as a backup. In such a case, the multiplex scheme of the present invention would simply include that fourth gyro. Likewise, if less than three gyros were needed for a particular application, the multiplex scheme of the present invention would still find utility with a two-gyro package.

What is claimed is:

1. An inertial measurement instrument contained within a compact housing, said instrument comprising:

a plurality of vibratory rotation sensors, each sensor having a thin-walled axi-symmetric hemispherical shell resonator capable of vibrating in at least one of a plurality of standing waves;

means associated with each sensor for controlling the amplitude of the standing wave on the resonator in that sensor;

means associated with each sensor for applying excitations to the resonator in that sensor;

means associated with each sensor for reading out information about the standing wave on the resonator in that sensor; and a multiplexer circuit, connected to said controlling means and said excitation means for selectively activating both said control and excitation means.

2. The inertial measurement instrument of claim 1 wherein said information reading out means comprises an A.C. buffer amplifier connected to the resonators in said plurality of vibratory rotation sensors.

3. The inertial measurement instrument of claim 1 wherein said multiplexer circuit comprises analog switches that connect said control means and said excitation means to only one vibratory rotation sensor at a time.

4. The inertial measurement instrument of claim 3 wherein said control means comprises drive amplifiers and said excitation means comprise drive amplifiers.

5. The inertial measurement instrument of claim 3 wherein said control means and said excitation means comprise the same drive amplifiers.

6. The inertial measurement instrument of claim 3 wherein said analog switches operate at a switching frequency that is a multiple of the gyro operating frequency.

7. The intertial measurement system of claim 1 wherein said multiplexer circuit activates both said control and excitation means on a frequency division basis, with a unique frequency assigned to each one of said sensors.

8. The inertial measurement system of claim 1 wherein said multiplex circuit activates both said control and excitation means on a frequency division basis, with a unique frequency assigned to each one of said sensors, and by time division, connecting said control means and excitation means to only one sensor at a time.

9. The inertial measurement system of claim 8 wherein said line division operates at a switching frequency that is a multiple of the gyro operating frequency.

* * * * *